(12) United States Patent
Prebble

(10) Patent No.: US 9,977,956 B2
(45) Date of Patent: May 22, 2018

(54) SELECTING PRIMARY GROUPS DURING PRODUCTION OF A FLOWCHART OBJECT FROM AN IMAGE

(71) Applicant: Konica Minolta Laboratory U.S.A., Inc., San Mateo, CA (US)

(72) Inventor: Tim Prebble, Longmont, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 11 days.

(21) Appl. No.: 15/223,449

(22) Filed: Jul. 29, 2016

(65) Prior Publication Data

US 2018/0032807 A1 Feb. 1, 2018

(51) Int. Cl.
*G06K 9/00* (2006.01)
*G06K 9/46* (2006.01)
*G06K 9/34* (2006.01)
*G06T 11/20* (2006.01)

(52) U.S. Cl.
CPC ..... *G06K 9/00456* (2013.01); *G06K 9/00449* (2013.01); *G06K 9/00463* (2013.01)

(58) Field of Classification Search
USPC .......................... 382/113, 203, 176; 345/441
See application file for complete search history.

(56) References Cited

U.S. PATENT DOCUMENTS

| | | | | |
|---|---|---|---|---|
| 5,386,508 A | * | 1/1995 | Itonori ................ | G05B 19/056 382/113 |
| 5,537,522 A | * | 7/1996 | Shibuta ................ | G06T 11/206 345/441 |
| 5,563,991 A | * | 10/1996 | Mahoney ........... | G06K 9/00476 382/113 |
| 5,802,535 A | * | 9/1998 | Shibuta .................... | G06T 7/11 715/209 |
| 6,314,194 B1 | * | 11/2001 | Michael ............. | G06F 17/5045 250/559.34 |
| 7,136,082 B2 | * | 11/2006 | Saund ................ | G06K 9/00409 345/619 |
| 7,298,382 B1 | * | 11/2007 | Tanaguchi ........ | G06F 17/30271 345/619 |
| 7,310,784 B1 | * | 12/2007 | Gottlieb .................... | G06F 8/34 715/763 |
| 7,515,752 B2 | * | 4/2009 | Tremblay ........... | G06K 9/00402 382/182 |
| 9,182,952 B2 | * | 11/2015 | Qi ............................. | G06F 8/35 |
| 2002/0150297 A1 | * | 10/2002 | Gorbatov ............ | G06F 3/04883 382/202 |

(Continued)

*Primary Examiner* — Kathleen Y Dulaney
(74) *Attorney, Agent, or Firm* — Osha Liang LLP

(57) ABSTRACT

A method for image processing. The method includes: reading an image of a flowchart; identifying, within the image, a plurality of paths corresponding to the flowchart; grouping the plurality of paths into a plurality of groups including a first group and a second group; calculating a plurality of likelihood scores corresponding to flowchart elements for each of the plurality of groups; identifying a first path belonging to the first group and the second group; and selecting the first group as the primary group for the first path based on a maximum likelihood score for the first group and a maximum likelihood score for the second group; and generating a flowchart object based on the primary group for the first path.

20 Claims, 6 Drawing Sheets

(56) References Cited

U.S. PATENT DOCUMENTS

| | | | | |
|---|---|---|---|---|
| 2006/0062463 A1* | 3/2006 | Li | ................... | G06K 9/00476 382/186 |
| 2006/0062464 A1* | 3/2006 | Li | ................... | G06K 9/00476 382/186 |
| 2006/0062465 A1* | 3/2006 | Li | ....................... | G06K 9/222 382/186 |
| 2006/0062475 A1* | 3/2006 | Li | ................... | G06K 9/00476 382/203 |

\* cited by examiner

| Path | Path's Groups | Primary Group, Prior to Resolution | Primary Group, After Resolution. Possibility #1 | Primary Group, After Resolution. Possibility #2 |
|---|---|---|---|---|
| 1 | A, B | A | B | A |
| 2 | A, B | A | B | A |
| 3 | B | B | B | None |

FIG. 8

| Group | Group Members | Likelihood Score |
|---|---|---|
| A | 1, 2 | 0.9 as Node |
| B | 1, 2, 3 | 0.6 as Connector Body |

FIG. 9

SELECTING PRIMARY GROUPS DURING PRODUCTION OF A FLOWCHART OBJECT FROM AN IMAGE

BACKGROUND

Writing boards such as whiteboards and blackboards are frequently used in many different settings (e.g., academic, corporate, non-profit, residential, etc.). Various content including text, drawings, tables, flowcharts, and graphs may be drawn or placed on the writing boards for lectures, training, brainstorming sessions, etc.

In order to electronically record these ideas, a photograph of the writing board may be taken. Further, image processing such as optical character recognition (OCR), stroke recognition, and reconstruction may be executed to extract the contents of the writing board from the image.

In some circumstances, it is beneficial to be able to produce a "flowchart object" from the captured image of a flowchart. The flowchart object is an object in computer memory which consists of nodes, connectors, node contents, connector labels, etc. A variety of representations may be produced from such an object. For example, the flowchart object may be used to produce a PowerPoint representation of the flowchart. Such a representation is easily editable using the PowerPoint application.

Images of flowcharts could originate from various sources such as photographs of flowcharts drawn on whiteboards and scans of documents containing flowcharts. The automatic creation of an editable version of a flowchart is useful because it allows for the manipulation (e.g., editing, addition or deletion of content) of the flowchart without the need for manually producing the initial editable version.

SUMMARY

In general, in one aspect, the invention relates to a method for image processing. The method comprises: reading an image of a flowchart; identifying, within the image, a plurality of paths corresponding to the flowchart; grouping the plurality of paths into a plurality of groups comprising a first group and a second group; calculating a plurality of likelihood scores corresponding to flowchart elements for each of the plurality of groups; identifying a first path belonging to the first group and the second group; selecting the first group as the primary group for the first path based on a maximum likelihood score for the first group and a maximum likelihood score for the second group; and generating a flowchart object based on the primary group for the first path.

In general, in one aspect, the invention relates to a non-transitory computer readable medium (CRM) storing computer readable program code embodied therein. The program code: reads an image of a flowchart; identifies, within the image, a plurality of paths corresponding to the flowchart; groups the plurality of paths into a plurality of groups comprising a first group and a second group; calculates a plurality of likelihood scores corresponding to flowchart elements for each of the plurality of groups; identifies a first path belonging to the first group and the second group; selects the first group as the primary group for the first path based on a maximum likelihood score for the first group and a maximum likelihood score for the second group; and generates a flowchart object based on the primary group for the first path.

In general, in one aspect, the invention relates to a system for image processing. The system comprises: a memory; and a processor connected to the memory that: reads an image of a flowchart; identifies, within the image, a plurality of paths corresponding to the flowchart; groups the plurality of paths into a plurality of groups comprising a first group and a second group; calculates a plurality of likelihood scores corresponding to flowchart elements for each of the plurality of groups; identifies a first path belonging to the first group and the second group; selects the first group as the primary group for the first path based on a maximum likelihood score for the first group and a maximum likelihood score for the second group; and generates a flowchart object based on the primary group for the first path.

Other aspects of the invention will be apparent from the following description and the appended claims.

BRIEF DESCRIPTION OF DRAWINGS

FIGS. 8-9 each show an implementation example in accordance with one or more embodiments of the invention.

DETAILED DESCRIPTION

Figure 1:
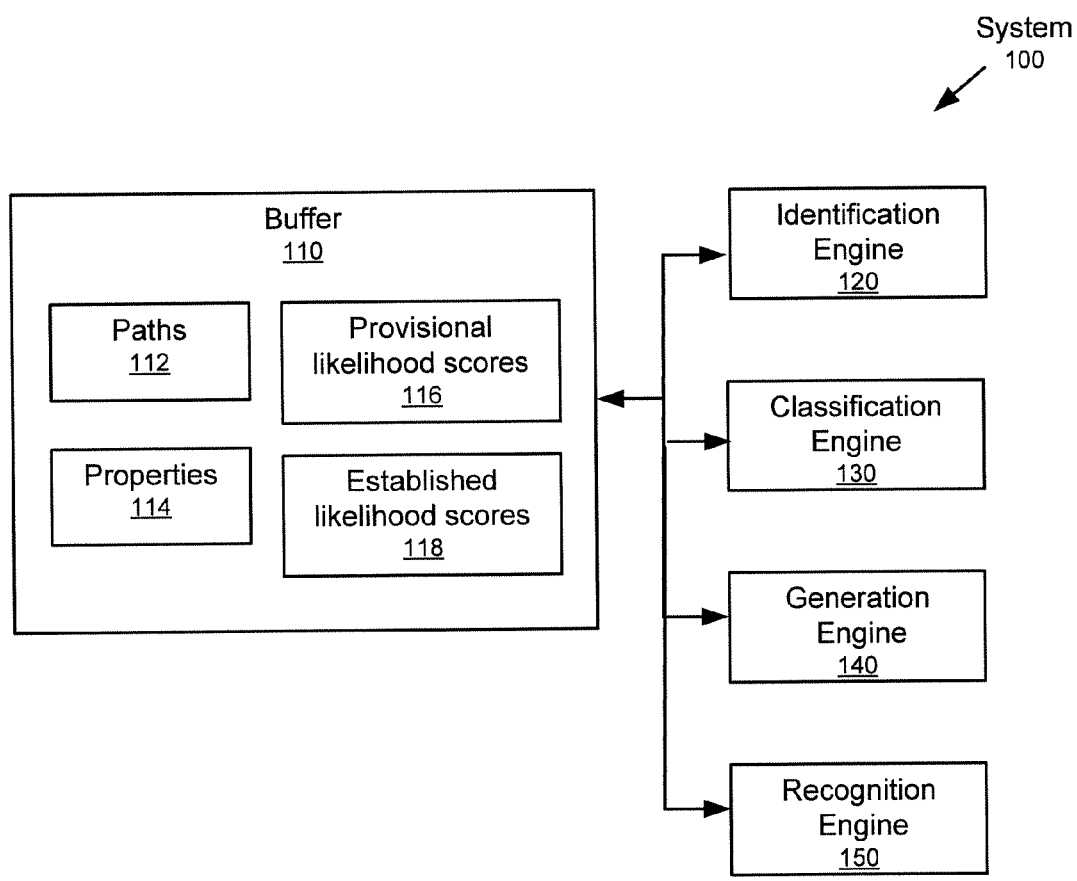
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention generally provide a method, a non-transitory computer readable medium (CRM), and a system for image processing. The image processing includes transforming an image of a flowchart into an editable representation of the flowchart.

In general, one or more embodiments of the invention can operate on a vectorized description of an input image of a flowchart (e.g., a photograph of a writing board or a scan of a document). In one or more embodiments of the invention, "parts" of the flowchart included in the vectorized description are identified as "paths," each of which intersects other paths only at the endpoints. The paths may be vectorized path geometry. Subsequently, each path is classified as a flowchart element (discussed below). However, because individual paths may fail to constitute a single flowchart element, the identified paths may be arranged into groups, where a single group corresponds to a single flowchart element.

In one or more embodiment of the invention, a path cannot self-intersect, unless the path is unterminated (i.e., no visible start or end point exists). Unterminated paths such as a circular path self-intersect at exactly one point. Alternatively, a path may be terminated (i.e., two visible endpoints). The endpoints may be either in free space or at the intersection of the path and one or more other paths.

Those of ordinary skill in the art, having the benefit of this detailed description, will appreciate that a flowchart has multiple elements including: nodes (a shape, e.g., rectangle, usually containing text, connected to other nodes via connectors), complete connectors (e.g., arrows) between the nodes, connector caps (e.g., arrow head), connector bodies (e.g., the bulk of the connector; the connector minus the cap), node content (e.g., text within node), and connector labels (e.g., text associated with connector). Accordingly, each path may be classified as: a node, a complete connector, a connector cap, a connector body, node content, and a connector label, or as a part of one of these elements.

In one or more embodiments of the invention, each path and group has properties. In one or more embodiments of the invention, the properties are computed once and never change. The value for each property may be a floating point (non-integral) number in the range [0,1]. Examples of the properties are as follows:

a. "Forms Enclosure" representing to what degree the path/group forms an enclosed region (a fully enclosed region, such as a circle or rectangle, would have a value of 1.);
 b. "Encloses Other Paths" representing to what degree the path/group encloses other paths;
 c. "Is Rectangular" representing to what degree the path/group resembles a rectangle;
 d. "Is Circular" representing to what degree the path/group resembles a circle;
 e. "Is Diamond" representing to what degree the path/group resembles a diamond;
 f. "Relative Size" representing how large the path/group is with respect to the other paths/groups. (e.g., towards 1 means larger);
 g. "Is Text" representing to what degree the path/group resembles text; and
 h. "Is Arrow" representing to what degree the path/group resembles an arrow.

In one or more embodiments of the invention, the classification includes two evaluation phases: a "solo" evaluation phase and a "neighbor-based" evaluation. In the solo evaluation phase, each path is analyzed by itself, without regard to other paths and to groups. In the neighbor-based evaluation, groups and neighboring paths are considered.

In one or more embodiments of the invention, the solo evaluation phase is executed iteratively, each iteration operating on a single path, and each iteration including: (a) calculating a provisional likelihood score, based upon the path's properties, indicating the likelihood of the path being each type of flowchart element. After all iterations are complete (provisional scores being determined for all paths), (b) established likelihood scores are calculated for each path based on the provisional likelihood scores calculated in the step (a). In other words, each path has a provisional likelihood score for each type of flowchart element (i.e., node, connector, connecter cap, etc.). Similarly, each path has an established likelihood score for each type of flowchart element (i.e., node, connector, connector cap, etc.). In one or more embodiments of the invention, the provisional likelihood score is a confidence value between 0 and 1 associated with the flowchart elements and is calculated with fuzzy logic systems. In one or more embodiments of the invention, the established likelihood score for the solo evaluation phase is calculated based on a predetermined weight value (e.g., 1) multiplied by the provisional likelihood score. In other words, in the solo evaluation phase, the established likelihood scores for a path are initialized to the provisional likelihood scores for the path.

In one or more embodiments of the invention, the neighbor-based evaluation phase is also executed iteratively, and each iteration includes: (c) calculating a provisional likelihood score for each path indicating the likelihood of the path being each type of flowchart element. The provisional likelihood score for a path is based on the path's properties, the established likelihood score for the path, the established likelihood scores of the path's neighboring paths, the likelihood scores of the path's neighboring groups, the path's primary group's likelihood score, and auxiliary data involving the relationships of the path to other paths or groups. Such auxiliary data may include the distance from the path to the nearest neighboring path or group which considers itself to be a node. Another example of auxiliary data is the degree to which the path extends between two nodes (meaning two neighboring paths/groups which consider themselves to be nodes). In one or more embodiments of the invention, the provisional likelihood score is calculated with fuzzy logic systems. After all iterations are complete (provisional scores being determined for all paths), (d) established likelihood scores are calculated for each path based on the provisional likelihood scores calculated in the step (c). Specifically, the existing/current established likelihood scores for a path are updated to incorporate the newly calculated provisional likelihood scores for the path (discussed below).

In one or more embodiments of the invention, a likelihood score for each group (i.e., the likelihood that the group is a node, text, a connector, etc.) is calculated based on the group's properties, which are static, and the established likelihood scores of the paths (calculated in (d)) that are members of the group. Calculation of the likelihood score for each group also occurs after the solo evaluation phase (i.e., calculated following (b)).

In one or more embodiments of the invention, a flowchart object is constructed based upon the final established likelihood score of each path and group. The flowchart object may consist of multiple sub-objects representing nodes, connectors, connector caps, node contents, and connector labels. In one or more embodiments of the invention, the text node may be produced by performing character recognition such as intelligent character recognition (ICR) or OCR.

The flowchart object could be displayed and manipulated directly with custom built code, or other representations could be constructed from it. For example, a PowerPoint or scalable vector graphics (SVG) description of the flowchart could be generated from the flowchart object. The flowchart object is a flexible and modifiable description of the flowchart. It is not tied to any particular representation or output format, but almost any such representation or format could be generated from it.

In one or more embodiments of the invention, a path belongs to or has membership in multiple groups. In such a situation, the path selects its primary group, which is usually the group with the strongest (highest valued) likelihood. Each path may have at most one primary group. For example, assume path 1 belongs to groups A and B, and group A's likelihood score is 0.85 as Node, and group B's likelihood score is 0.53 as Connector Body. Because A's score exceeds B's score, the group A is selected for path 1's primary group.

In one or more embodiments of the invention, a group may be designated as a prohibited primary group. In the above example, if group A was designated a prohibited primary group but group B was not, then group B would be selected as path 1's primary group even though group A has a higher likelihood score. If both groups A and B were designated as prohibited primary groups, path 1 would have no primary group.

In one or more embodiments of the invention, the primary groups are designated as prohibited during "primary group resolution," which forces the primary groups to be consistent. "Consistency" means that every path which is claimed by a primary group must in turn claim that primary group as its own.

In the example shown in FIG. 8, the primary groups are not consistent because group B claims paths 1, 2, and 3, but paths 1 and 2 claim the group A as their primary group. Two possible resolutions #1 and #2 to this inconsistency are shown in FIG. 8. Possibility #1 has all three paths claiming the group B as their primary group, and possibility #2 has paths 1 and 2 keeping the higher-ranking group A as their primary group, the consequence being that path 3 is forced to give up its primary group. In one or more embodiments of the claimed invention, possibility #2 is chosen since it allows the group with the highest likelihood score to be a primary group.

In one or more embodiments of the invention, the primary group resolution is executed at predetermined times and phases.

Turning now to FIG. 1, a system (100) in accordance with one or more embodiments of the invention includes a buffer (110), an identification engine (120), a classification engine (130), a generation engine (140), and a recognition engine (150). Each of these components (110, 120, 130, 140, 150) may be located on the same computing device (e.g., personal computer (PC), laptop, tablet PC, smart phone, server, mainframe, cable box, kiosk, etc.) or may be located on different computing devices connected by a network of any size and any topology having wired and/or wireless segments.

In one or more embodiments of the invention, the system (100) includes the buffer (110). The buffer (110) may be implemented in hardware (i.e., circuitry), software, or any combination thereof. The buffer (110) may be of any size or type (e.g., memory, hard drive, etc.). The buffer (110) may store: paths (112) each representing a part of a flowchart by vectorized path geometry; properties (114) for each path and group of the path; provisional likelihood scores (116) for the paths, calculated in the solo and the neighbor-based evaluation phases; and established likelihood scores (118) calculated after each phase has completed.

The paths (112) may be represented by vectors defined in any format. The properties (114) are set for each path and group, and each includes a degree of an enclosed region formed by the path or group; a degree of enclosure that the path or group encloses another path or group; degrees of similarities between the path or group and a node-like shape (e.g., rectangle, circle, diamond, etc.), text, and an arrow; and a relative size to another path or group. Each property may take on a floating point value in the range [0,1]. The provisional likelihood scores (116) and the established likelihood scores (118) are confidence values between 0 and 1 associated with the flowchart elements.

In one or more embodiments of the invention, the system (100) includes the identification engine (120). The identification engine (120) may be implemented in hardware (i.e., circuitry), software, or any combination thereof. The identification engine (120) may read an image capturing a writing board or scanning a document containing a flowchart, and identify paths and groups in the image. This identification process may include generating a vector description of the image and other steps known to those of ordinary skill in the art. The identification engine (120) may store the identified paths (112) and properties (114) in the buffer (110).

In one or more embodiments of the invention, the system (100) includes the classification engine (130). The classification engine (130) may be implemented in hardware (i.e., circuitry), software, or any combination thereof. The classification engine (130) may execute the solo evaluation phase and the neighbor-based evaluation phase, as discussed above and below.

In one or more embodiments of the invention, the classification engine (130) selects one of the groups as a primary group for each path. Additionally, the classification engine (130) may determine if the grouped paths are inconsistent. If so, the classification engine (130) may change primary groups for the paths by executing the primary group resolution.

In one or more embodiments of the invention, the system (100) includes the generation engine (140). The generation engine (140) may be implemented in hardware (i.e., circuitry), software, or any combination thereof. The generation engine (140) is configured to generate flowchart objects according to the classification made by the classification engine (130). For example, a PowerPoint or SVG description of the flowchart may be generated from the flowchart object. The generation engine (140) utilizes the established likelihood scores (118) stored in the buffer (110).

In one or more embodiments of the invention, the system (100) includes the recognition engine (150). The recognition engine (150) may be implemented in hardware (i.e., circuitry), software, or any combination thereof. The recognition engine (150) is configured to execute ICR or OCR on the interior of nodes, and the output of the ICR or OCR is node content for the nodes.

Although FIG. 1 shows the system (100) as having five components (110, 120, 130, 140, 150), the system (100) may have more or fewer components. For example, the system (100) may include a scanner or a smart phone with a digital camera to capture the image of the writing board from which the paths (112) are identified.

Figure 2:
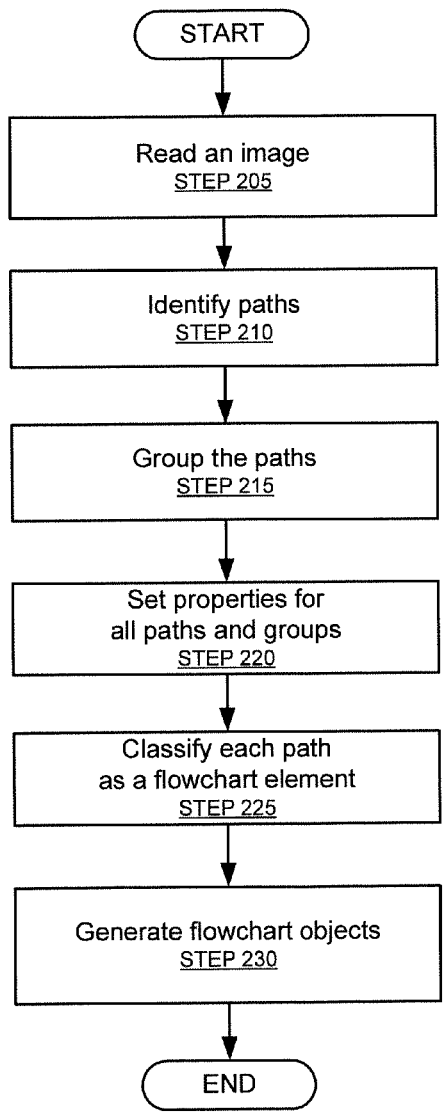
FIGS. 2-7 each show a flowchart in accordance with one or more embodiments of the invention.

FIG. 2 shows a flowchart in accordance with one or more embodiments of the invention. The flowchart depicts a process for image processing. One or more of the steps in FIG. 2 may be performed by the components (110, 120, 130, 140, 150) of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, the identification engine (120) reads an image capturing a writing board or scanning a document including a flowchart (STEP 205). The image may be of any size or format. The image may be obtained from outside of the system (100). Alternatively, the image may be stored on a memory of the system (100) in advance.

In STEP 210, the identification engine (120) identifies paths (112) from the image. The paths may be of any size or format. Each path intersects other paths only at the endpoints. The identification engine (120) may store the paths (112) in the buffer (110). In STEP 215, the identification engine (120) groups each path into zero or more groups. Next, the identification engine (120) may set properties (114) for each path and group in STEP 220. The classification engine (130) may store the properties (114) in the buffer (110).

Figure 3:
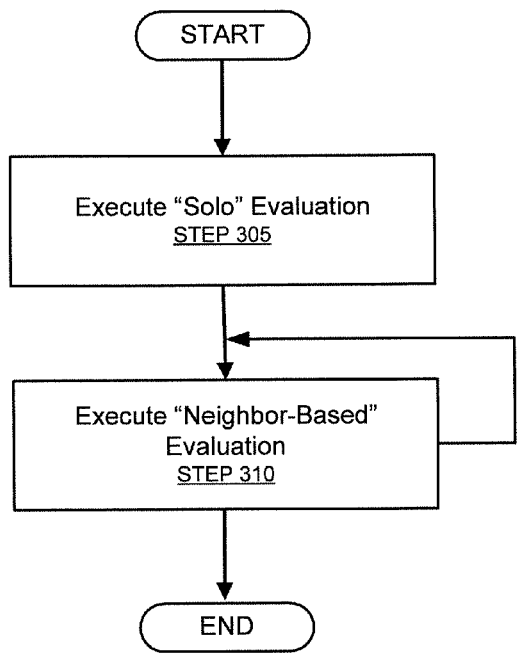

In STEP 225, the classification engine (130) classifies each path and group as a complete or partial flowchart element. As shown in FIG. 3, this step consists of the two evaluation steps: a solo evaluation (STEP 305) and a neighbor-based evaluation (STEP 310). In one or more embodiments, the solo evaluation (STEP 305) is only executed once while the neighbor-based evaluation (STEP 310) is executed multiple times. The details of each evaluation step is discussed below.

Referring back to FIG. 2, in STEP 230, the generation engine (140) generates flowchart objects according to the classification (i.e., the established likelihood scores (118) stored in the buffer (110)), and the process ends.

Figure 4:
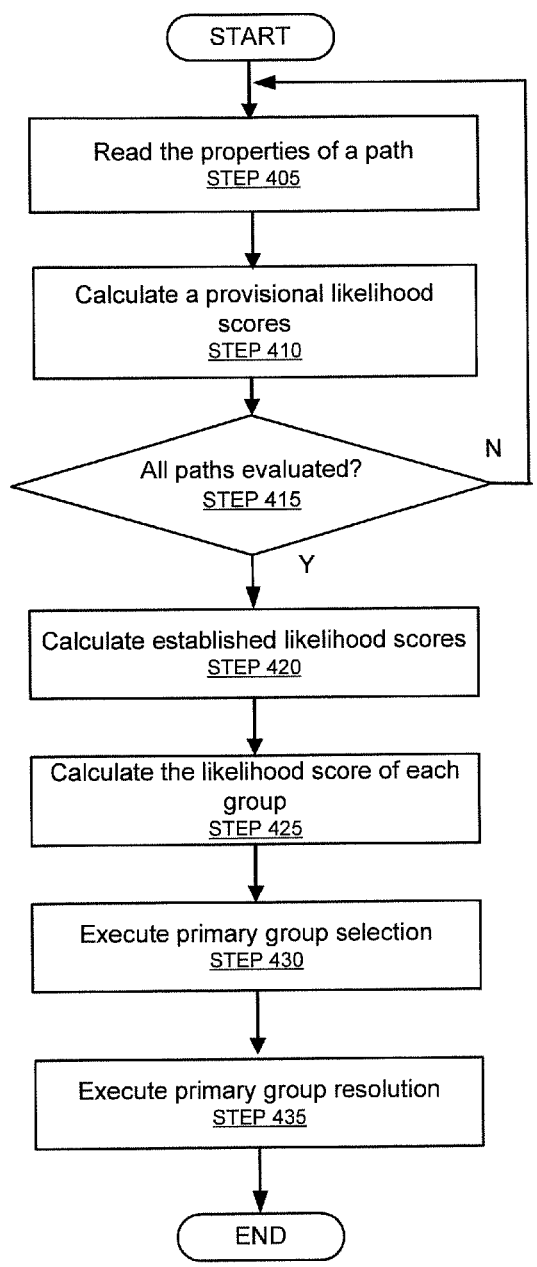
Figure 5:
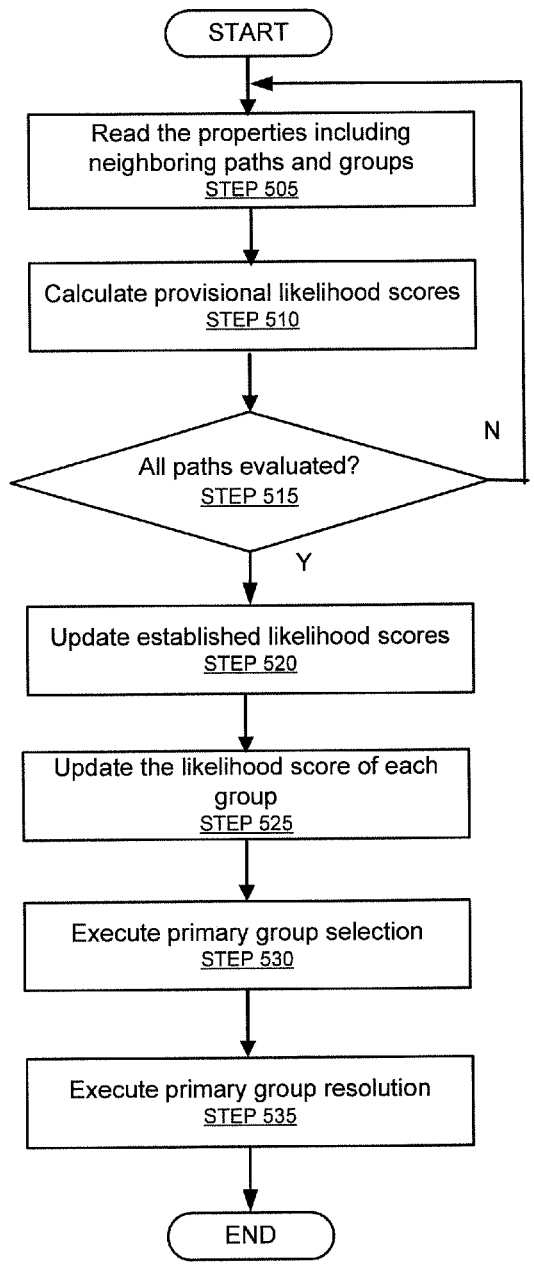

FIGS. 4 and 5 each show a flowchart in accordance with one or more embodiments of the invention. The flowcharts depict the details of the solo evaluation step (STEP 305 in FIG. 3) and the neighbor-based evaluation step (STEP 310 in FIG. 3), which are executed by the classification engine (130). One or more of the steps in FIGS. 4 and 5 may be performed by the components (110, 120, 130, 140, 150) of the system (100), discussed above in reference to FIG. 1. In one or more embodiments of the invention, one or more of the steps shown in FIGS. 4 and 5 may be omitted, repeated, and/or performed in a different order than the order shown in FIGS. 4 and 5. Accordingly, the scope of the invention should not be considered limited to the specific arrangement of steps shown in FIGS. 4 and 5.

Referring to FIG. 4, in STEP 405, the classification engine (130) reads the properties of a path. Next, the classification engine (130) calculates the provisional likelihood score of the path by evaluating its properties without regard to other paths and groups (STEP 410). The classification engine (130) may calculate the provisional likelihood score with fuzzy logic systems. In STEP 415, the classification engine (130) determines whether all paths and groups are evaluated. If so, the process proceeds to STEP 420. Otherwise, the process returns to STEP 405. In these steps, the provisional likelihood scores (116) for all paths are stored in the buffer (110).

In STEP 420, the classification engine (130) calculates established likelihood scores for all paths. In the solo evaluation phase, the established likelihood scores of a path are set to the provisional likelihood scores of the path. In other words, the established likelihood scores for a path are initialized to the provisional likelihood scores for the path.

In STEP 425, the likelihood scores for the groups are calculated based on the properties of the groups and the established likelihood scores for the paths in the groups. In one or more embodiments, in the solo evaluation phase, the established likelihood scores are given little or zero weight (i.e., the likelihood score for a group in the solo evaluation phase is calculated solely or at least primarily on the properties of the group).

Figure 6:
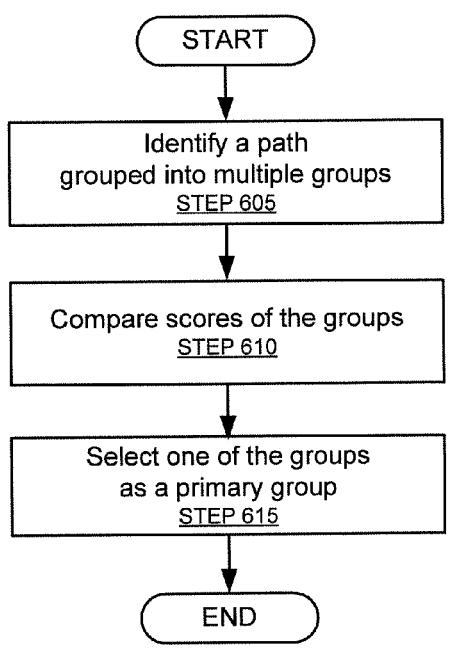

In STEP 430, the classification engine (130) executes primary group selection steps, each of which is described in FIG. 6. The classification engine (130) identifies a path that is assigned to multiple groups in STEP 605, and compares the established likelihood scores of the multiple groups in STEP 610. The classification engine (130) then selects one of the groups as a primary group for the path that belongs to the multiple groups (STEP 615). For example, the classification engine (130) may select the group having the highest likelihood score as the primary group.

Referring back to FIG. 4, in STEP 435, the classification engine (130) executes the primary group resolution to resolve the inconsistency of the primary group selection. The details of the resolution process is discussed later.

FIG. 5 describes the details of the neighbor-based evaluation step (STEP 310 in FIG. 3). STEPs 505-535 are similar to STEPs 405-435 in the solo evaluation. However, there are some differences.

For example, in STEP 510, provisional likelihood scores are calculated for a path based on the path's properties, the established likelihood score for the path, the established likelihood scores of the path's neighboring paths, the likelihood scores of the path's neighboring groups, the path's primary group's likelihood score, and auxiliary data involving the relationships of the path to other paths or groups. Such auxiliary data may include the distance from the path to the nearest neighboring path or group which considers itself to be a node.

As another example, in STEP 520, the established likelihood scores are updated for each path to incorporate the newly calculated provisional likelihood scores for the path. For example, the established likelihood scores may be calculated by the following equation: Updated established likelihood score=(Current established likelihood score*(1−update_strength))+(Provisional likelihood score*update_strength). The variable "update_strength" is attenuated each time the process in FIG. 5 is repeated. The classification engine (130) stores the calculated established likelihood score in the buffer (110).

As yet another example, in STEP 525, the likelihood scores for the groups are updated based on the properties of the groups and the established likelihood scores for the paths in the groups. Unlike in the solo evaluation phase, here the established likelihood scores are more mature and thus give more than zero or negligible weight in the calculation.

Figure 7:
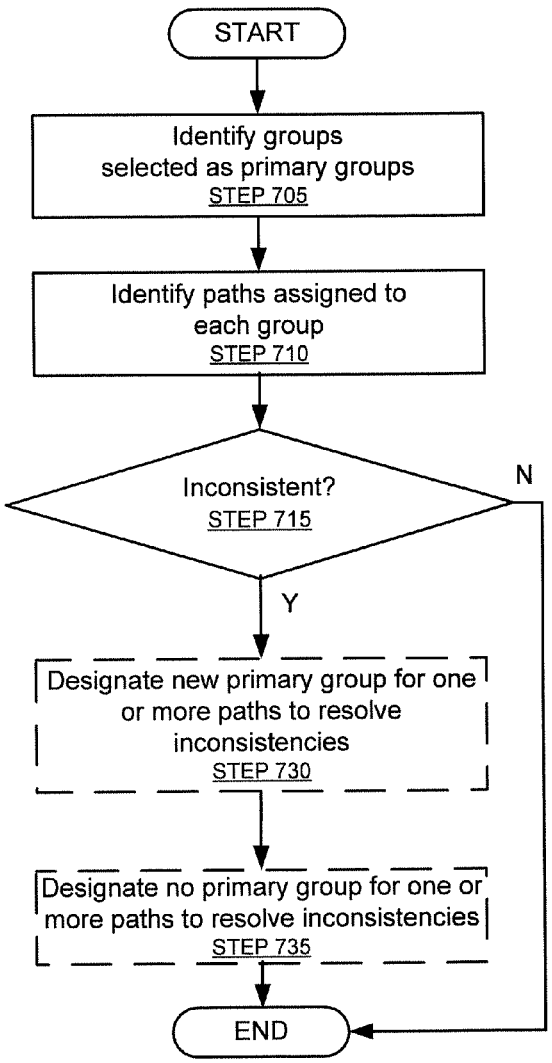

FIG. 7 shows the details of the primary group resolution step (STEP 435 in FIG. 4 and STEP 535 in FIG. 5). As shown in FIGS. 4 and 5, the classification engine (130) may execute the resolution step at the end of each evaluation step.

In STEP 705, the classification engine (130) identifies the groups designated as the primary groups. In an example shown in FIG. 8, group A is selected as the primary group by path 1 and 2, and group B is selected by path 3. Thus, groups A and B are identified in this step.

Next, in STEP 710, the classification engine (130) identifies the paths belonging to each group. In the example of FIG. 8, paths 1, 2, and 3 are identified as belonging to groups.

In STEP 715, the classification engine (130) determines whether the identified primary groups are inconsistent. As discussed above, "consistency" means that every path which is claimed by a primary group must in turn claim that primary group as its own. In this example, groups A and B are inconsistent because group B claims paths 1, 2, and 3, but paths 1 and 2 claim the group A as their primary group. If it is determined that the primary groups are inconsistent, the process proceeds to STEP 730. Otherwise, the resolution process may end.

In STEP 730, although group membership never changes, a new primary group may be selected for one or more of the paths to resolve the inconsistencies. For example, prior to resolution, a path may belong to both group A and group B. The path identifies group A as its primary group. As part of STEP 730, group B is selected instead as the primary group for the path. However, even after resolution, the path is still a member of both group A and group B.

In STEP 735, although group membership never changes, no primary group may be designated for a path to resolve the inconsistencies. For example, prior to resolution, a path may belong only to group B and designate group B as its primary group. As part of STEP 735, no primary group is designated for the path. In other words, the path has no primary group although it is still a member of group B after resolution.

Figure 10:
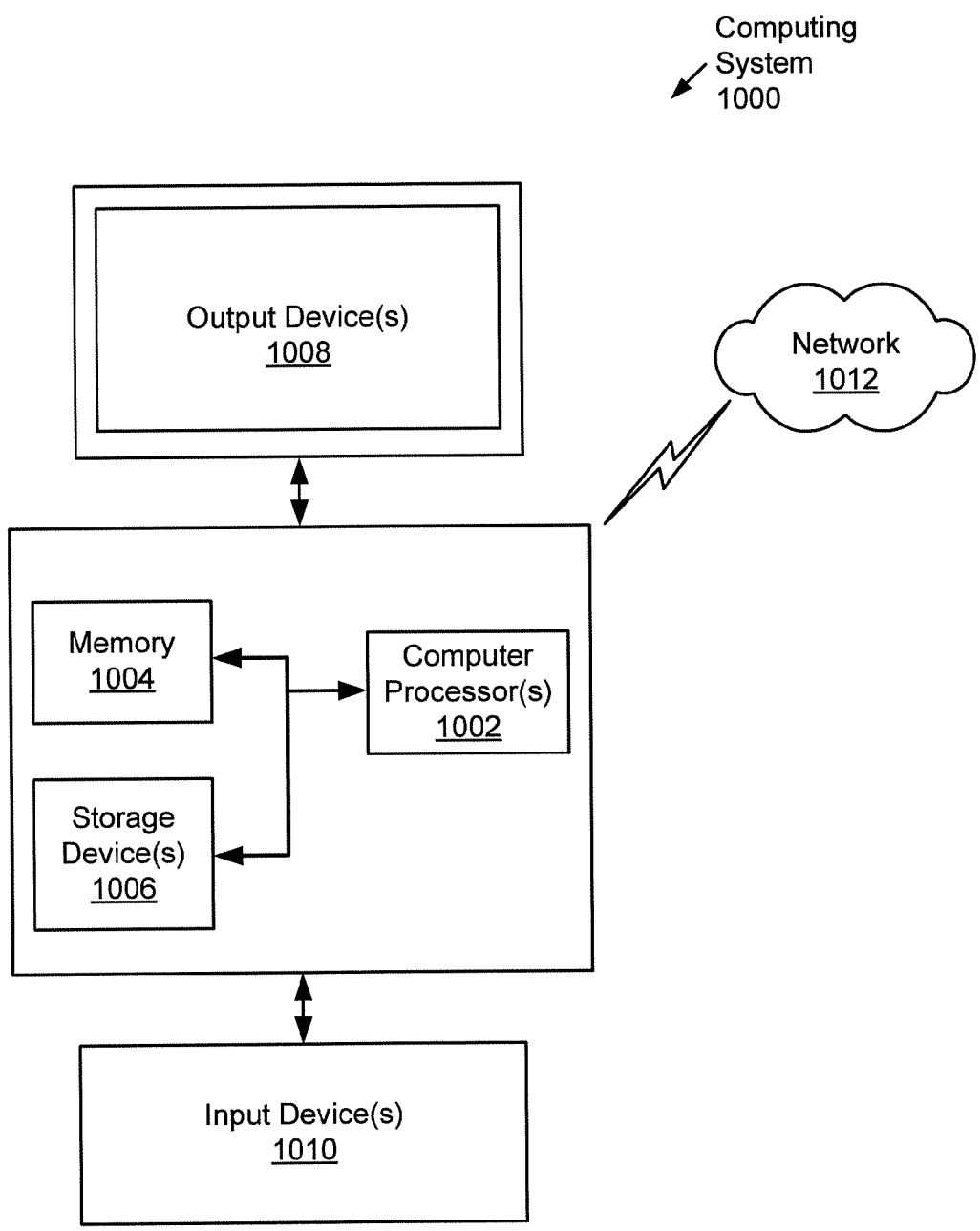
FIG. 10 shows a computer system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 10, the computing system (1000) may include one or more computer processor(s) (1002), associated memory (1004) (e.g., random access memory (RAM), cache memory, flash memory, etc.), one or more storage device(s) (1006) (e.g., a hard disk, an optical drive such as a compact disk (CD) drive or digital versatile disk (DVD) drive, a flash memory stick, etc.), and numerous other elements and functionalities. The computer processor(s) (1002) may be an integrated circuit for processing instructions. For example, the computer processor(s) (1002) may be one or more cores or micro-cores of a processor. The computing system (1000) may also include one or more input device(s) (1010), such as a touchscreen, keyboard, mouse, microphone, touchpad, electronic pen, or any other type of input device. Further, the computing system (1000) may include one or more output device(s) (1008), such as a screen (e.g., a liquid crystal display (LCD), a plasma display, touchscreen, cathode ray tube (CRT) monitor, projector, or other display device), a printer, external storage, or any other output device. One or more of the output device(s) (1008) may be the same or different from the input device(s) (1010). The computing system (1000) may be connected to a network (1012) (e.g., a local area network (LAN), a wide area network (WAN) such as the Internet, mobile network, or any other type of network) via a network interface connection (not shown). The input and output device(s) may be locally or remotely (e.g., via the network (1012)) connected to the computer processor(s) (1002), memory (1004), and storage device(s) (1006). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (500) may be located at a remote location and connected to the other elements over a network (512). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for image processing, comprising:
   reading an image of a flowchart;
   identifying, within the image, a plurality of paths corresponding to the flowchart;
   grouping the plurality of paths into a plurality of groups comprising a first group and a second group;
   calculating, by a computer processor, a plurality of likelihood scores corresponding to flowchart elements for each of the plurality of groups, by:
      calculating, during a solo evaluation phase, a plurality of provisional likelihood scores corresponding to flowchart elements for each the plurality of paths; and
      calculating, during a neighbor-based evaluation phase and based on the plurality of provisional likelihood scores, a plurality of likelihood scores corresponding to flowchart elements for each of the plurality of paths;
   identifying a first path belonging to the first group and the second group;
   selecting the first group as the primary group for the first path based on a maximum likelihood score for the first group and a maximum likelihood score for the second group; and
   generating an editable version of the flowchart for an electronic document based on the primary group for the first path.

2. The method of claim 1, further comprising:
   determining, after selecting the first group as the primary group for the first path, an inconsistency exists by identifying a second path belonging to the second group but not the first group,
   wherein the second group is the primary group for the second path; and
   resolving the inconsistency by selecting the second group as the primary group for the first path.

3. The method of claim 1, further comprising:
   determining, after selecting the first group as the primary group for the first path, an inconsistency exists by identifying a second path belonging to the second group but not the first group,
   wherein the second group is the primary group for the second path; and
   resolving the inconsistency by selecting no primary group for the second path.

4. The method of claim 2, wherein the resolving is executed at predetermined times.

5. The method of claim 1, wherein each of the plurality of paths intersects another path at path endpoints.

6. The method of claim 1, wherein:
   the plurality of groups further comprises a third group;
   the first path also belongs to the third group;
   the third group has a maximum likelihood score that exceeds the maximum likelihood score of the first group; and
   the third group is not selected as the primary group for the first path because the third group is classified as prohibited.

7. The method of claim 1, wherein the plurality of likelihood scores for each of the plurality of groups is calculated with fuzzy logic systems.

8. The method of claim 1, wherein each of the plurality of groups is classified as one selected from a group consisting of: a node, a connector body, a connector cap, a complete connector, a node content, and a connector label.

9. The method of claim 1, wherein each of the plurality of groups has properties comprising information representing: a degree to which the group forms an enclosed region; a degree to which the group encloses another path which is not a member of the group; degrees of similarity between the group and a rectangle, a circle, a diamond, text, and an arrow.

10. The method of claim 1, wherein each of the plurality of likelihood scores for each of the plurality of groups is a confidence value between 0 and 1.

11. A non-transitory computer readable medium (CRM) storing computer readable program code embodied therein that:
reads an image of a flowchart;
identifies, within the image, a plurality of paths corresponding to the flowchart;
groups the plurality of paths into a plurality of groups comprising a first group and a second group;
calculates a plurality of likelihood scores corresponding to flowchart elements for each of the plurality of groups, by:
calculating, during a solo evaluation phase, a plurality of provisional likelihood scores corresponding to flowchart elements for each the plurality of paths; and
calculating, during a neighbor-based evaluation phase and based on the plurality of provisional likelihood scores, a plurality of likelihood scores corresponding to flowchart elements for each of the plurality of paths;
identifies a first path belonging to the first group and the second group;
selects the first group as the primary group for the first path based on a maximum likelihood score for the first group and a maximum likelihood score for the second group; and
generates an editable version of the flowchart for an electronic document based on the primary group for the first path.

12. The non-transitory CRM of claim 11, further storing computer readable program code embodied thereon that:
determines, after selecting the first group as the primary group for the first path, an inconsistency exists by identifying a second path belonging to the second group but not the first group,
wherein the second group is the primary group for the second path; and
resolves the inconsistency by selecting the second group as the primary group for the first path.

13. The non-transitory CRM of claim 11, further storing computer readable program code embodied thereon that:
determines, after selecting the first group as the primary group for the first path, an inconsistency exists by identifying a second path belonging to the second group but not the first group,
wherein the second group is the primary group for the second path; and
resolves the inconsistency by selecting no primary group for the second path.

14. The non-transitory CRM of claim 11, wherein:
the plurality of groups further comprises a third group;
the first path also belongs to the third group;
the third group has a maximum likelihood score that exceeds the maximum likelihood score of the first group; and
the third group is not selected as the primary group for the first path because the third group is classified as prohibited.

15. The non-transitory CRM of claim 11, wherein each of the plurality of groups has properties comprising information representing: a degree to which the group forms an enclosed region; a degree to which the group encloses another path which is not a member of the group; degrees of similarity between the group and a rectangle, a circle, a diamond, text, and an arrow.

16. A system for image processing, comprising:
a memory; and
a processor connected to the memory that:
reads an image of a flowchart;
identifies, within the image, a plurality of paths corresponding to the flowchart;
groups the plurality of paths into a plurality of groups comprising a first group and a second group;
calculates a plurality of likelihood scores corresponding to flowchart elements for each of the plurality of groups, by:
calculating, during a solo evaluation phase, a plurality of provisional likelihood scores corresponding to flowchart elements for each the plurality of paths; and
calculating, during a neighbor-based evaluation phase and based on the plurality of provisional likelihood scores, a plurality of likelihood scores corresponding to flowchart elements for each of the plurality of paths;
identifies a first path belonging to the first group and the second group;
selects the first group as the primary group for the first path based on a maximum likelihood score for the first group and a maximum likelihood score for the second group; and
generates an editable version of the flowchart object based on the primary group for the first path.

17. The system of claim 16, wherein the processor also:
determines, after selecting the first group as the primary group for the first path, an inconsistency exists by identifying a second path belonging to the second group but not the first group,
wherein the second group is the primary group for the second path; and
resolves the inconsistency by selecting the second group as the primary group for the first path.

18. The system of claim 16, wherein the processor also:
determines, after selecting the first group as the primary group for the first path, an inconsistency exists by identifying a second path belonging to the second group but not the first group,
wherein the second group is the primary group for the second path; and
resolves the inconsistency by selecting no primary group for the second path.

19. The system of claim 16, wherein:
the plurality of groups further comprises a third group;
the first path also belongs to the third group;

the third group has a maximum likelihood score that exceeds the maximum likelihood score of the first group; and the third group is not selected as the primary group for the first path because the third group is classified as prohibited.

20. The system of claim 16, wherein each of the plurality of groups has properties comprising information representing: a degree to which the group forms an enclosed region; a degree to which the group encloses another path which is not a member of the group; degrees of similarity between the group and a rectangle, a circle, a diamond, text, and an arrow.

* * * * *